United States Patent
Fukuda et al.

(10) Patent No.: US 7,356,104 B2
(45) Date of Patent: Apr. 8, 2008

(54) RADIO COMMUNICATION APPARATUS AND INTERFERENCE AVOIDING METHOD

(76) Inventors: Shinji Fukuda, 7-21, Minamikatae 4-chome, Jounan-ku, Fukuoka-shi, Fukuoka 814-0143 (JP); Yoshihiro Takehisa, 2-46-14, Nakao, Minami-ku, Fukuoka-shi, Fukuoka 811-1364 (JP)

( * ) Notice: Subject to any disclaimer, the term of this patent is extended or adjusted under 35 U.S.C. 154(b) by 662 days.

(21) Appl. No.: 10/886,585

(22) Filed: Jul. 9, 2004

(65) Prior Publication Data
US 2005/0020271 A1    Jan. 27, 2005

(30) Foreign Application Priority Data

Jul. 10, 2003 (JP) .............................. 2003-195057
Jul. 10, 2003 (JP) .............................. 2003-195059

(51) Int. Cl.
*H04L 25/08* (2006.01)
(52) U.S. Cl. ..................... 375/346; 455/447
(58) Field of Classification Search ................ 375/130, 375/132, 135–136, 141, 295, 346; 455/447, 455/63.1, 67.13
See application file for complete search history.

(56) References Cited

U.S. PATENT DOCUMENTS

| | | | |
|---|---|---|---|
| 5,541,954 A | 7/1996 | Emi | |
| 6,115,407 A * | 9/2000 | Gendel et al. | 375/132 |
| 6,144,693 A | 11/2000 | Tabeta | |
| 6,240,126 B1 * | 5/2001 | Ohashi et al. | 375/132 |
| 6,466,608 B1 | 10/2002 | Hong et al. | |
| 6,519,460 B1 * | 2/2003 | Haartsen | 455/452.1 |
| 2002/0186749 A1 | 12/2002 | Jones | |
| 2003/0026353 A1 | 2/2003 | Chen et al. | |

(Continued)

FOREIGN PATENT DOCUMENTS

JP         59004243         1/1984

(Continued)

OTHER PUBLICATIONS

International Search Report with Written Opinion dated Dec. 22, 2004.

(Continued)

*Primary Examiner*—Khanh C. Tran

(57) ABSTRACT

A radio communication apparatus and method employs frequency hopping in a predetermined pattern based on a hopping carrier table. An intermittent receiving section activates a carrier frequency designating section every constant cycle to give a command for receiving the control channels of opposing radio base stations. In the case in which a hopping order in a hopping carrier table is skipped by n to carry out switching every intermittent receiving cycle in an intermittent receiving operation, an intermittent receiving cycle is set in such a manner that the n and a total number m of hopping carrier frequencies in the hopping carrier table have a prime relationship with each other. The electric field strength of a carrier frequency in a spare carrier list is measured by the intermittent receiving operation and an interference counter of a spare carrier is increased or decreased corresponding to a frequency at which the electric field strength exceeds or does not exceed a predetermined threshold. A carrier frequency deleted from a hopping pattern and placed in the spare carrier list is set to have the worst value as the initialized value of its interference counter.

9 Claims, 12 Drawing Sheets

U.S. PATENT DOCUMENTS

2004/0240526 A1* 12/2004 Schmandt et al. .......... 375/135

FOREIGN PATENT DOCUMENTS

| JP | 04313926 | 11/1992 |
| JP | 04345331 | 12/1992 |
| JP | 728248 | 3/1995 |
| JP | 7107010 | 4/1995 |
| JP | 7147553 | 6/1995 |
| JP | 09093654 | 4/1997 |
| JP | 11196027 | 7/1999 |
| JP | 2000 092700 | 3/2000 |
| JP | 2001 257846 | 9/2001 |
| JP | 2002 158667 | 5/2002 |
| JP | 2003 163652 | 6/2003 |

OTHER PUBLICATIONS

International Search Report dated Oct. 21, 2004.

* cited by examiner

FIG. 3

CARRIER {0-95}    SPARE CH {0-26,30,35,40,45,50,55,60,65,70,75,80,85,90,95}

| INDEX | BASE HOP PATTERN NO. | | | | | | | | | |
|---|---|---|---|---|---|---|---|---|---|---|
| | P0 | P1 | P2 | P3 | P4 | P5 | P6 | P7 | P8 | P9 |
| 00 | 31 | 36 | 41 | 46 | 51 | 56 | 61 | 66 | 71 | 76 |
| 01 | 36 | 41 | 46 | 51 | 56 | 61 | 66 | 71 | 76 | 81 |
| 02 | 41 | 46 | 51 | 56 | 61 | 66 | 71 | 76 | 81 | 86 |
| 03 | 46 | 51 | 56 | 61 | 66 | 71 | 76 | 81 | 86 | 91 |
| 04 | 51 | 56 | 61 | 66 | 71 | 76 | 81 | 86 | 91 | 27 |
| 05 | 56 | 61 | 66 | 71 | 76 | 81 | 86 | 91 | 27 | 32 |
| 06 | 61 | 66 | 71 | 76 | 81 | 86 | 91 | 27 | 32 | 37 |
| 07 | 66 | 71 | 76 | 81 | 86 | 91 | 27 | 32 | 37 | 42 |
| 08 | 71 | 76 | 81 | 86 | 91 | 27 | 32 | 37 | 42 | 47 |
| 09 | 76 | 81 | 86 | 91 | 27 | 32 | 37 | 42 | 47 | 52 |
| 10 | 81 | 86 | 91 | 27 | 32 | 37 | 42 | 47 | 52 | 57 |
| 11 | 86 | 91 | 27 | 32 | 37 | 42 | 47 | 52 | 57 | 62 |
| 12 | 91 | 27 | 32 | 37 | 42 | 47 | 52 | 57 | 62 | 67 |
| 13 | 27 | 32 | 37 | 42 | 47 | 52 | 57 | 62 | 67 | 72 |
| 14 | 32 | 37 | 42 | 47 | 52 | 57 | 62 | 67 | 72 | 77 |
| 15 | 37 | 42 | 47 | 52 | 57 | 62 | 67 | 72 | 77 | 82 |
| 16 | 42 | 47 | 52 | 57 | 62 | 67 | 72 | 77 | 82 | 87 |
| 17 | 47 | 52 | 57 | 62 | 67 | 72 | 77 | 82 | 87 | 92 |
| 18 | 52 | 57 | 62 | 67 | 72 | 77 | 82 | 87 | 92 | 28 |
| 19 | 57 | 62 | 67 | 72 | 77 | 82 | 87 | 92 | 28 | 33 |
| 20 | 62 | 67 | 72 | 77 | 82 | 87 | 92 | 28 | 33 | 38 |
| 21 | 67 | 72 | 77 | 82 | 87 | 92 | 28 | 33 | 38 | 43 |
| 22 | 72 | 77 | 82 | 87 | 92 | 28 | 33 | 38 | 43 | 48 |
| 23 | 77 | 82 | 87 | 92 | 28 | 33 | 38 | 43 | 48 | 53 |
| 24 | 82 | 87 | 92 | 28 | 33 | 38 | 43 | 48 | 53 | 58 |
| 25 | 87 | 92 | 28 | 33 | 38 | 43 | 48 | 53 | 58 | 63 |
| 26 | 92 | 28 | 33 | 38 | 43 | 48 | 53 | 58 | 63 | 68 |
| 27 | 28 | 33 | 38 | 43 | 48 | 53 | 58 | 63 | 68 | 73 |
| 28 | 33 | 38 | 43 | 48 | 53 | 58 | 63 | 68 | 73 | 78 |
| 29 | 38 | 43 | 48 | 53 | 58 | 63 | 68 | 73 | 78 | 83 |
| 30 | 43 | 48 | 53 | 58 | 63 | 68 | 73 | 78 | 83 | 88 |
| 31 | 48 | 53 | 58 | 63 | 68 | 73 | 78 | 83 | 88 | 93 |
| 32 | 53 | 58 | 63 | 68 | 73 | 78 | 83 | 88 | 93 | 29 |
| 33 | 58 | 63 | 68 | 73 | 78 | 83 | 88 | 93 | 29 | 34 |
| 34 | 63 | 68 | 73 | 78 | 83 | 88 | 93 | 29 | 34 | 39 |
| 35 | 68 | 73 | 78 | 83 | 88 | 93 | 29 | 34 | 39 | 44 |
| 36 | 73 | 78 | 83 | 88 | 93 | 29 | 34 | 39 | 44 | 49 |
| 37 | 78 | 83 | 88 | 93 | 29 | 34 | 39 | 44 | 49 | 54 |
| 38 | 83 | 88 | 93 | 29 | 34 | 39 | 44 | 49 | 54 | 59 |
| 39 | 88 | 93 | 29 | 34 | 39 | 44 | 49 | 54 | 59 | 64 |
| 40 | 93 | 29 | 34 | 39 | 44 | 49 | 54 | 59 | 64 | 69 |
| 41 | 29 | 34 | 39 | 44 | 49 | 54 | 59 | 64 | 69 | 74 |
| 42 | 34 | 39 | 44 | 49 | 54 | 59 | 64 | 69 | 74 | 79 |
| 43 | 39 | 44 | 49 | 54 | 59 | 64 | 69 | 74 | 79 | 84 |
| 44 | 44 | 49 | 54 | 59 | 64 | 69 | 74 | 79 | 84 | 89 |
| 45 | 49 | 54 | 59 | 64 | 69 | 74 | 79 | 84 | 89 | 94 |
| 46 | 54 | 59 | 64 | 69 | 74 | 79 | 84 | 89 | 94 | 31 |
| 47 | 59 | 64 | 69 | 74 | 79 | 84 | 89 | 94 | 31 | 36 |
| 48 | 64 | 69 | 74 | 79 | 84 | 89 | 94 | 31 | 36 | 41 |
| 49 | 69 | 74 | 79 | 84 | 89 | 94 | 31 | 36 | 41 | 46 |
| 50 | 74 | 79 | 84 | 89 | 94 | 31 | 36 | 41 | 46 | 51 |
| 51 | 79 | 84 | 89 | 94 | 31 | 36 | 41 | 46 | 51 | 56 |
| 52 | 84 | 89 | 94 | 31 | 36 | 41 | 46 | 51 | 56 | 61 |
| 53 | 89 | 94 | 31 | 36 | 41 | 46 | 51 | 56 | 61 | 66 |
| 54 | 94 | 31 | 36 | 41 | 46 | 51 | 56 | 61 | 66 | 71 |

FIG. 4(a)
INTERMITTENT RECEIVING CYCLE=7
NUMBER OF HOPPING CARRIERS=15

| INTERMITTENT CYCLE ORDER NUMBER | FRAME NUMBER | REFERENCE INDEX NUMBER |
|---|---|---|
| 0 | 1 | 1 |
| 1 | 8 | 8 |
| 2 | 15 | 0 |
| 3 | 22 | 7 |
| 4 | 29 | 14 |
| 5 | 36 | 6 |
| 6 | 43 | 13 |
| 7 | 50 | 5 |
| 8 | 57 | 12 |
| 9 | 64 | 4 |
| 10 | 71 | 11 |
| 11 | 78 | 3 |
| 12 | 85 | 10 |
| 13 | 92 | 2 |
| 14 | 99 | 9 |
| 15 | 106 | 1 |
| 16 | 113 | 8 |
| 17 | 120 | 0 |
| 18 | 127 | 7 |
| ... | ... | ... |

FIG. 4(b)
INTERMITTENT RECEIVING CYCLE=16
NUMBER OF HOPPING CARRIERS=15

| INTERMITTENT CYCLE ORDER NUMBER | FRAME NUMBER | REFERENCE INDEX NUMBER |
|---|---|---|
| 0 | 1 | 1 |
| 1 | 17 | 2 |
| 2 | 33 | 3 |
| 3 | 49 | 4 |
| 4 | 65 | 5 |
| 5 | 81 | 6 |
| 6 | 97 | 7 |
| 7 | 113 | 8 |
| 8 | 129 | 9 |
| 9 | 145 | 10 |
| 10 | 161 | 11 |
| 11 | 177 | 12 |
| 12 | 193 | 13 |
| 13 | 209 | 14 |
| 14 | 225 | 0 |
| 15 | 241 | 1 |
| 16 | 257 | 2 |
| 17 | 273 | 3 |
| 18 | 289 | 4 |
| ... | ... | ... |

FIG. 4(c)
INTERMITTENT RECEIVING CYCLE=64
NUMBER OF HOPPING CARRIERS=15

| INTERMITTENT CYCLE ORDER NUMBER | FRAME NUMBER | REFERENCE INDEX NUMBER |
|---|---|---|
| 0 | 1 | 1 |
| 1 | 65 | 5 |
| 2 | 129 | 9 |
| 3 | 193 | 13 |
| 4 | 257 | 2 |
| 5 | 321 | 6 |
| 6 | 385 | 10 |
| 7 | 449 | 14 |
| 8 | 513 | 3 |
| 9 | 577 | 7 |
| 10 | 641 | 11 |
| 11 | 705 | 0 |
| 12 | 769 | 4 |
| 13 | 833 | 8 |
| 14 | 897 | 12 |
| 15 | 961 | 1 |
| 16 | 1025 | 5 |
| 17 | 1089 | 9 |
| 18 | 1153 | 13 |
| ... | ... | ... |

FIG. 4(d)
INTERMITTENT RECEIVING CYCLE=15
NUMBER OF HOPPING CARRIERS=16

| INTERMITTENT CYCLE ORDER NUMBER | FRAME NUMBER | REFERENCE INDEX NUMBER |
|---|---|---|
| 0 | 1 | 1 |
| 1 | 16 | 0 |
| 2 | 31 | 15 |
| 3 | 46 | 14 |
| 4 | 61 | 13 |
| 5 | 76 | 12 |
| 6 | 91 | 11 |
| 7 | 106 | 10 |
| 8 | 121 | 9 |
| 9 | 136 | 8 |
| 10 | 151 | 7 |
| 11 | 166 | 6 |
| 12 | 181 | 5 |
| 13 | 196 | 4 |
| 14 | 211 | 3 |
| 15 | 226 | 2 |
| 16 | 241 | 1 |
| 17 | 256 | 0 |
| 18 | 271 | 15 |
| ... | ... | ... |

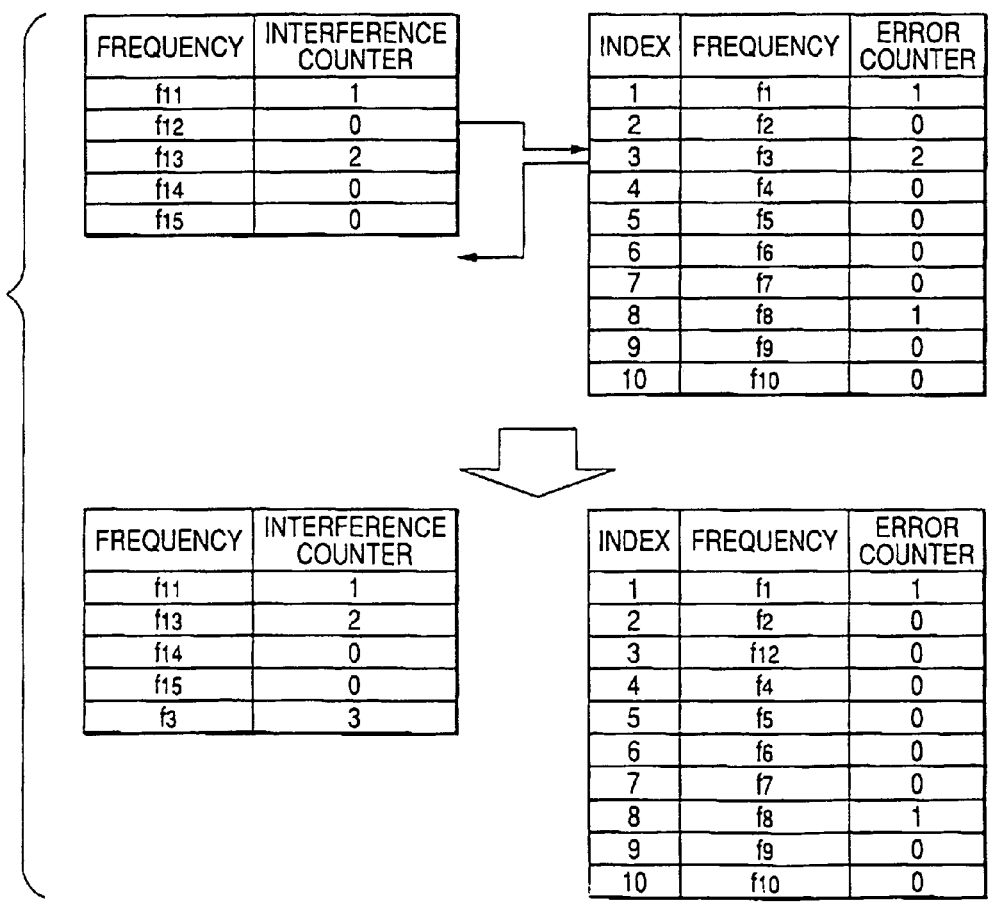

RADIO COMMUNICATION APPARATUS AND INTERFERENCE AVOIDING METHOD

BACKGROUND OF THE INVENTION

1. Field of the Invention

The present invention relates to a radio communication apparatus using a frequency hopping method for switching a hopping carrier frequency to be used in accordance with a predetermined hopping pattern and an interference avoiding method.

2. Description of the Related Art

In recent years, in an ISM band (for industrial scientific medical treatment) having a 2.4 GHz band, various apparatuses including a microwave oven are used and the frequency band is apt to cause the problem of a radio wave interference between the apparatuses. For this reason, there have been employed means for avoiding a radio wave interference by utilizing a spectrum diffusing technique using a direct diffusing method which is represented by a radio LAN and a spectrum diffusing technique (FHSS) using a frequency hopping method which is represented by Bluetooth.

Moreover, various apparatuses use the ISM band having the 2.4 GHz band and an interference is apt to be generated in the frequency band. The spectrum diffusing technique using a frequency hopping method is comparatively resistant to a disturbance. Also in the case in which a communication is to be carried out in the ISM band, the frequency hopping method carries out hopping into a specific carrier frequency thereof in a constant cycle, resulting in the receipt of an interference if an interference source for continuously carrying out generation for a comparatively long time at a frequency overlapping with a certain carrier frequency (hereinafter referred to as a carrier frequency).

For example, as described in JP-A-7-107010, there has been proposed an adaptive frequency hopping method for changing a hopping pattern to avoid an interference.

A specific operation will be described below with reference to FIG. 14. FIG. 14 is a diagram showing the structure of a conventional adaptive radio communication apparatus using a frequency hopping method.

The conventional radio communication apparatus shown in FIG. 14 has a frequency slot switching portion 104 for sequentially switching a frequency slot (a carrier frequency) in accordance with a frequency hopping pattern. In the frequency slot switching portion 104, observing means 110 observes the state of the receipt of the frequency slot which is being used as a frequency hopping pattern. When receiving the transfer of a state which can be an obstacle by the observing means 110, hopping pattern changing means 111 deletes the frequency slot (the carrier frequency) from a hopping pattern table 113 and adds a spare unused carrier (a spare carrier) to the hopping pattern table, and furthermore, outputs the changed contents to a transmission data transfer path 105 in order to transfer the same contents to a communication partner by utilizing a transmission free time. Consequently, the hopping patterns to be used for a communication are modified mutually, thereby implementing the avoidance of an interference.

In the method of changing a hopping pattern to avoid an interference as described in the Patent Document 1 including a method of hopping a carrier frequency in accordance with a predetermined hopping pattern, however, there is a problem in that a certain time is required until a change to an optimum hopping pattern is carried out after the start of a communication, and an interference might be caused during that time.

(The invention avoids an interference quickly)

However, a radio environment is changed during a communication. For this reason, there is a possibility that some carrier frequencies might be subjected to the interference of a disturbance wave during that time. If the carrier frequency which is once removed as a spare carrier from a hopping pattern by the interference is maintained to be unused, usable spare carriers are gone when the same number of carries as that of the spare carriers in total from the start of the communication are exchanged, and the carriers cannot be then exchanged. Consequently, it is hard to hold quality of the communication.

(The invention restores a spare carrier)

SUMMARY OF THE INVENTION

In order to solve the conventional problems, it is an object of the invention to provide an FHSS communication apparatus capable of holding quality of a communication corresponding to various changes in a radio environment.

A radio communication apparatus using a frequency hopping method according to the invention serves to carry out an intermittent receiving operation for intermittently rising and receiving control information transferred from a radio base station through a control channel every constant frame cycle while performing frequency hopping for each frame in accordance with a predetermined hopping pattern before the start of a communication, and to carry out an information transfer through a speech channel while timely replacing a carrier frequency having an interference with a spare carrier frequency to avoid the interference corresponding to the degree of the interference of a hopping carrier frequency after the start of the communication, and comprises a hopping carrier table for describing the hopping pattern, hopping carrier frequency designating means for giving a command for switching a hopping carrier frequency to a radio control portion, and intermittent receiving means for carrying out the intermittent receiving operation, and furthermore, has such a structure as to cause the number of cycle frames for executing an intermittent receipt and the total number of hopping carrier frequencies described in the hopping carrier table to have a prime relationship with each other.

In the FHSS communication apparatus according to the invention, moreover, exchangeable conditions are set more strictly than other spare carriers with respect to a carrier frequency deleted from a hopping pattern upon receipt of the interference of a disturbance wave, and furthermore, a priority to be added again to the hopping pattern is set to be lower than that of each of the other spare carriers. Thus, the carrier frequency is recycled to be exchangeable after sufficiently confirming that a communication can be carried out.

BRIEF DESCRIPTION OF THE DRAWINGS

FIG. 3 is an explanatory diagram showing a hopping carrier table to be used in the first example of the invention, FIG. 4(a) is an explanatory diagram showing a relationship among an intermittent receiving cycle number, a frame number to be received and an index of a hopping carrier table to be received in the case in which an intermittent receiving cycle is set to be 7 and the number of hopping carrier frequencies to be used is set to be 15 in the first example of the invention, FIG. 4(b) is an explanatory diagram showing the relationship among the intermittent receiving cycle number, the frame number to be received and the index of the hopping carrier table to be received in the case in which the intermittent receiving cycle is set to be 16 and the number of the hopping carrier frequencies to be used is set to be 15 in the first example of the invention, FIG. 4(c) is an explanatory diagram showing the relationship among the intermittent receiving cycle number, the frame number to be received and the index of the hopping carrier table to be received in the case in which the intermittent receiving cycle is set to be 64 and the number of the hopping carrier frequencies to be used is set to be 15 in the first example of the invention, FIG. 4(d) is an explanatory diagram showing the relationship among the intermittent receiving cycle number, the frame number to be received and the index of the hopping carrier table to be received in the case in which the intermittent receiving cycle is set to be 15 and the number of the hopping carrier frequencies to be used is set to be 16 in the first example of the invention, FIG. 9 is a spare carrier list table at time of the start of a speech according to the second example, FIG. 10 is a hopping pattern table at time of the start of the speech according to the second example, FIG. 11 is a transition diagram showing the spare carrier list table and the hopping pattern table before and after the exchange of a carrier frequency according to the second example.

DESCRIPTION OF THE PREFERRED EMBODIMENTS

A radio communication apparatus using a frequency hopping method according to a first example of the invention will be specifically described below with reference to the drawings.

FIRST EXAMPLE

Figure 1:
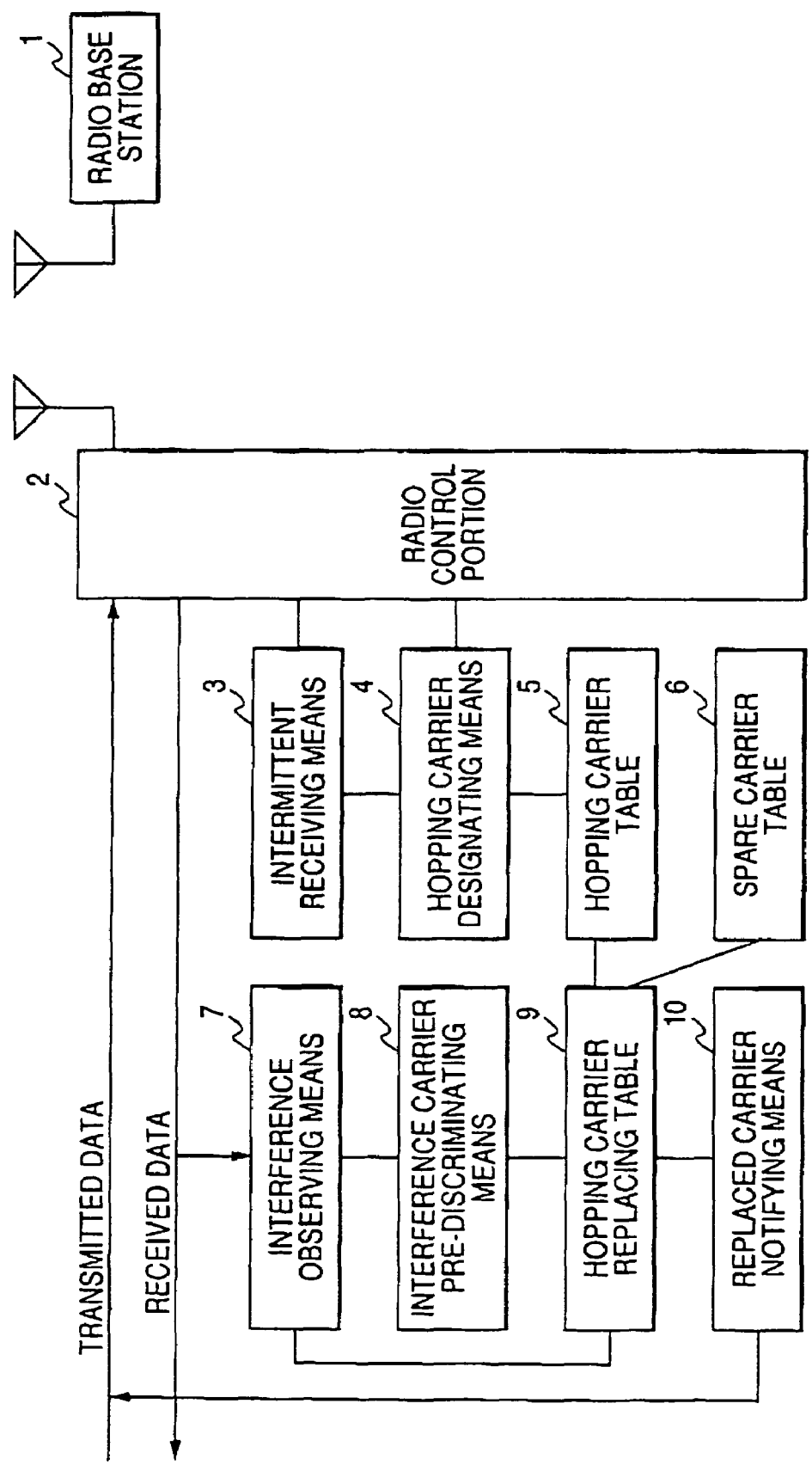
FIG. 1 is a diagram showing the structure of a radio communication apparatus using a frequency hopping method according to a first example of the invention.

FIG. 1 is a diagram showing the structure of a radio communication apparatus using a frequency hopping method according to a first example of the invention. In FIG. 1, 1 denotes a radio base station to be the communication partner of the radio communication apparatus using a frequency hopping method according to the example, 2 to 10 denote structural blocks of the radio communication control portion of the radio communication apparatus using the frequency hopping method according to the example, 2 denotes a radio control portion, 3 denotes intermittent receiving means, 4 denotes hopping carrier frequency designating means, 5 denotes a hopping carrier table, 6 denotes a spare carrier table, 7 denotes interference observing means, 8 denotes interference carrier pre-discriminating means, 9 denotes hopping carrier replacing means, and 10 denotes replaced carrier notifying means.

Figure 2:
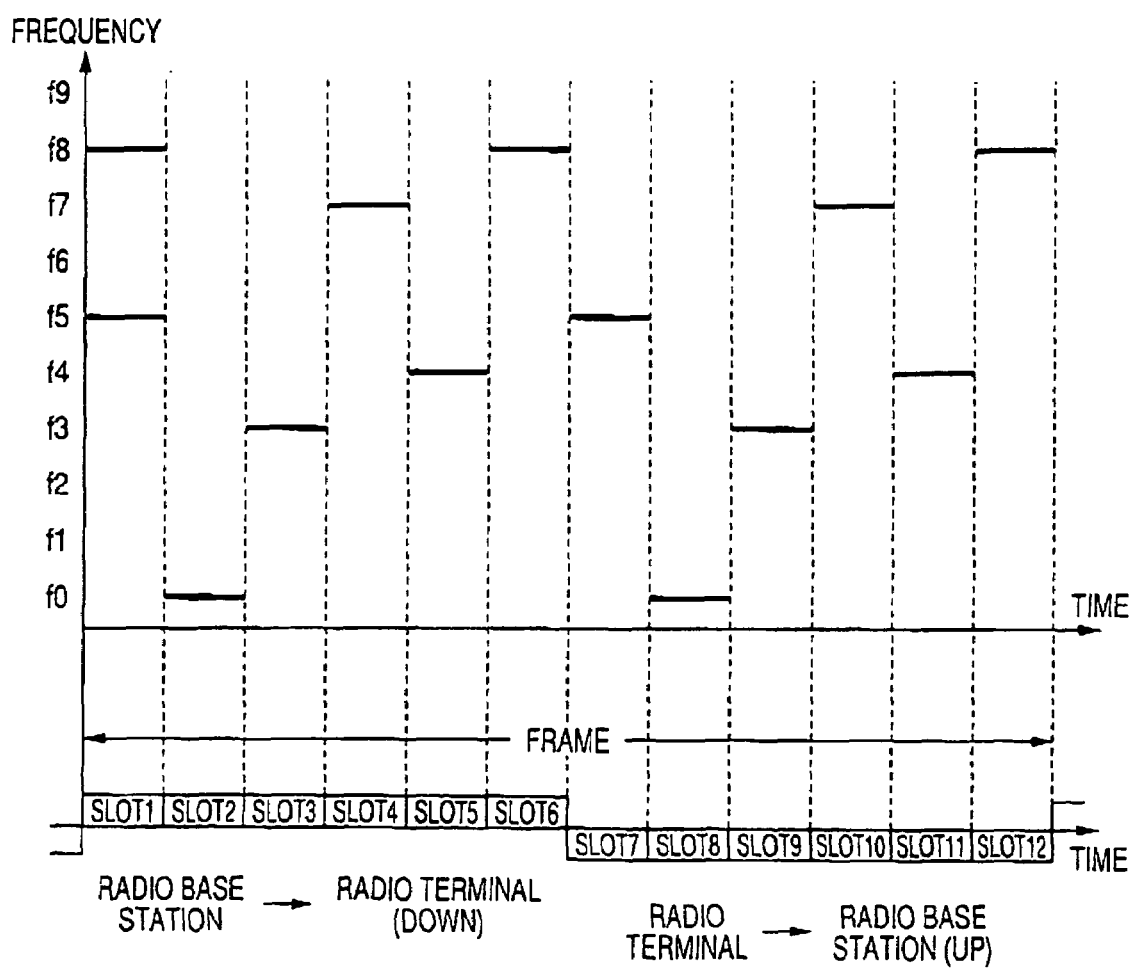
FIG. 2 is an explanatory diagram showing the concept of a frequency hopping method.

FIG. 2 is an explanatory diagram showing the concept of a frequency hopping method according to the first example, FIG. 3 is an explanatory diagram showing an example of a hopping carrier table to be used in the example, and FIG. 4 is a diagram showing a relationship among an intermittent receiving cycle number, a frame number to be received and an index of a hopping carrier table to be received in the case in which an intermittent receiving cycle and the total number of hopping carrier frequencies to be used are designated in the example.

First of all, the concept of the operation of the frequency hopping method according to the first example will be described with reference to FIG. 2. A communication between a radio base station and a radio terminal is constituted in such a manner that a predetermined time is divided as a frame and a time in the frame is further divided into a plurality of slots to carry out time division multiplex, and information in a bidirectional up-down direction can be communicated in the same frame. In the case in which each slot is used in a communication, the same frequency is used in an up-down pair slot in the frame, and furthermore, a frequency is switched (hopping) in a next frame time to avoid a radio interference caused by a fixed disturbance. The switching order (sequence) of the frequency is predetermined between the radio base station and the radio terminal, and is provided as a hopping carrier table together with a plurality of patterns having different offsets in the same sequence. Consequently, the synchronization of the communication can be continuously ensured. In the case in which a plurality of identical systems is present, furthermore, a plurality of hopping patterns having different offsets in the same slot can coexist. Therefore, it is possible to avoid a sequence collision by a disturbance and to increase a system capacity.

Next, the operation of the radio communication apparatus using the frequency hopping method according to the example will be described based on the concept of the operation of the frequency hopping method. In FIG. 1, the radio base station 1 uses at least one slot to assign a control channel and always transmits a control signal to be a reference to inform a plurality of radio terminals present in a radio circle of their own presence and to synchronize them, and gives the radio terminals a notice of an arrival, its own capability and a state required for setting a radio link. The radio control portion 2 of the radio terminal includes a modulating circuit and a demodulating circuit which are not shown, and serves to modulate transmission data and to transmit them as radio waves, and to demodulate the received radio waves and to extract received data. The intermittent receiving means 3 of the radio terminal is operated in only a standby state before a communication and operates the radio control portion 2 every frame cycle in which only the radio slot of control channel information given by the radio base station 1 is predetermined and thus causes the radio control portion 2 to intermittently carry out the receipt.

In order to reduce the consumed power of a circuit in the standby state, the radio control portion 2 is intermittently operated, which is effective means for a portable type radio terminal to be generally operated by a battery. A carrier frequency designated for the radio control portion 2 in order to receive the control channel information is determined by the hopping carrier frequency designating means 4 to read the hopping carrier table 5. The same hopping carrier table 5 is provided in the radio base station 1, which is not shown, and describes a sequence for hopping a carrier frequency and a plurality of patterns obtained by shifting the hopping sequence on a time basis, and an example thereof is shown in FIG. 3.

In the example shown in FIG. 3, it is indicated that 55 carrier frequencies to be used for the hopping and 10 hopping patterns P0 to P9 are prepared, and a carrier frequency number is uniquely obtained by specifying a hopping sequence index number and a hopping pattern number. Moreover, the same carrier frequency number does not appear twice for a period of one cycle of the hopping sequence (from an index number 00 to an index number 54 in the drawing), and the hopping sequence returns to the index number 00 again after proceeding to the index number 54 from the index number 00, and is thus repeated. Referring to any of the hopping patterns which is being used, the radio base station 1 gives a notice through the control channel and shares information together with the radio terminal.

In order to avoid a radio interference which will be described below, the radio communication apparatus using the frequency hopping method according to the example registers, in the spare carrier table 6, a spare carrier frequency which is not used as the hopping carrier frequency. In an example described in FIG. 3, there are prepared 96 carrier frequencies having carrier frequency numbers 0 to 95 in total which can be utilized by the radio communication apparatus using the frequency hopping method according to the example. For this reason, 41 carrier frequencies excluding 55 carrier frequencies to be used as the hopping carrier frequencies are registered for preparation in the spare carrier table 6.

Subsequently, description will be given to a receiving operation in the radio communication apparatus using a frequency hopping method according to the example. The data received and demodulated by the radio control portion 2 are subjected to a disturbance in the middle of a radio transmission from the radio base station 1 by checking an error detection sign such as CRC included in the received data which are not shown by the interference observing means 7, thereby deciding whether or not a receive data sign is erroneous. Irrespective of the received data which are transmitted through the control channel or a radio communication with the transmission, the normality of the received data sign is decided.

In the case in which the radio communication apparatus using a frequency hopping method according to the example is set in a standby state before the communication, the degree of the interference of the carrier frequency checked by the interference carrier pre-discriminating means 8 upon receipt of the result of the decision of the normality of the received data by the interference observing means 7 is previously discriminated before use in a communication. For example, more specifically, in the case in which the result of the decision of the interference observing means 7 is an error, 1 is added to an interference discrimination level X to obtain X=X+1. In the case in which the result of the decision is normal, 1 is subtracted from the interference discrimination level X to obtain X=X−1. It is assumed that the result of the subtraction has a minimum value of zero and does not take a negative value. In the case in which the interference discrimination level X thus calculated is greater than a preset threshold, a carrier frequency to be an object is decided to have a previous interference. The calculation of the interference discrimination level is continuously carried out until the communication is started.

Moreover, the received control channel information includes information in only a descending direction which is given to the radio terminals present in the radio circle of the radio base station 1. Therefore, the carrier frequency is hopped in accordance with a sequence shown in the hopping carrier table 5. To the contrary, in the case in which the hopping sequence is not conformed, the radio terminal cannot receive the control channel information of the radio base station 1 and is not synchronized.

Next, description will be given to a state set after the radio communication apparatus using the frequency hopping method according to the example starts a communication together with the radio base station 1.

In order to transfer to a communication state in which data are transmitted and received, it is necessary to set a two-way individual communication link (hereinafter referred to as a speech channel) by using a separate independent slot pair from the slot to be used in the control channel. Also in the speech channel, the carrier frequency is hopped in accordance with the sequence shown in the hopping carrier table 5 immediately after the start of the communication. However, the speech channel is the two-way individual communication link which is different from the control channel. If an agreement is reached between the radio base station 1 and the radio terminal, therefore, it is possible to carry out a control to change the carrier frequency to be used in the hopping sequence by both of them and to avoid a carrier frequency having an interference without using the carrier frequency. Description will be given to an example of an interference avoiding procedure utilizing the spare carrier frequency registered in the spare carrier table 6.

If it is decided that a decision of an error is obtained by the interference observing means 7 as a result of the receipt of data at the carrier frequency of the communication channel by the radio terminal, the result of the decision is transmitted to the hopping carrier replacing means 9. If it is decided that the carrier frequency to be an object is subjected to a steady interference by the hopping carrier replacing means 9, one of the spare carrier frequencies registered in the spare carrier table 6 is selected to carry out a modification in order to replace the space carrier frequency with the interference carrier frequency in the hopping sequence described in the hopping carrier table 5. In addition, the contents of the modification are given to the replaced carrier notifying means 10 to create transmission data for designating the replacement of the carrier frequency to the radio base station 1 and to transmit the same data from the radio control portion 2 by using an upward speech channel.

By repeating this operation in the state of the communication, a carrier frequency having a small interference is always utilized while following a change in the interference situation of the hopping carrier frequency to be used for the communication. The replacement of the carrier frequency is carried out in only the speech channel to be the individual communication link. Therefore, other radio terminals listening to the control channel are not influenced.

Next, description will be given to an example of a condition for deciding that the hopping carrier replacing means 9 is subjected to an interference. The received data are checked by the interference observing means 7. Only when a result of the decision is an error, 1 is added to an accumulative interference level Y to obtain Y=Y+1. In the case in which the accumulative interference level Y thus calculated exceeds a preset threshold, it is decided that the carrier frequency to be an object has the interference to replace the hopping carrier frequency.

In the standby state set before the start of the communication, the carrier frequency having the interference is previously discriminated by the interference carrier pre-discriminating means 8. Based on a result of the decision, the value of the accumulative interference level Y of the carrier frequency to be the object is set to be a value obtained by subtracting 1 from the threshold. Consequently, it is possible to quicken such a timing that the hopping carrier replacing means 9 discriminates the interference after the transfer to the communication state. More specifically, it is possible to enhance an interference avoiding capability in the communication by grasping the interference situation of all the hopping carrier frequencies to be utilized for the communication before the start of the communication.

In order to grasp the interference state of all of the hopping carrier frequencies in the standby state before the start of the communication, it is necessary to receive all of the hopping carrier frequencies. The receipt can be carried out if the radio terminal continuously receives, for each frame, the control channel given in accordance with the hopping sequence by the radio base station 1. However, an intermittent receipt is actually carried out. For this reason, a frame number to be received is skipped at random so that all of the hopping carrier frequencies cannot be received uniformly. Thus, some design is required.

In this respect, the radio communication apparatus using the frequency hopping method according to the example has such a structure that a cycle frame number for executing the intermittent receipt and the total number of hopping carrier frequencies to be used have a prime relationship with each other, that is, both of them have no common factor but the greatest common divisor of 1.

Specific description will be given with reference to FIGS. 4, 5 and 6. FIG. 4 shows a relationship between a frame number received for each intermittent receiving cycle (an intermitted receiving cycle number) and a reference index number of a hopping sequence (a hopping carrier table) in which the number of cycle frames for executing an intermittent receipt and the number of hopping carrier frequencies to be used are set to be parameters. In FIG. 4, the total number of the intermittent receiving cycles and the hopping carrier frequencies to be used are divided into four examples. The reference index number of the hopping sequence is set to be a remainder obtained by dividing the frame number by the number of the hopping carrier frequencies to be used. In the intermittent receipt, a hopping carrier having a number which is coincident with the reference index number is received.

FIG. 4(a) is a table showing a relationship in the case in which the intermittent receiving cycle is set to be 7 and the number of the hopping carrier frequencies to be used is set to be 15 as an example, in which the frame number is increased by seven to be the number of the intermittent receiving cycle frames every time an intermittent cycle order number is increased by one, while the reference index number is circulated without causing the same number to appear with 15 to be the number of the hopping carrier frequencies to be used set to be a cycle. More specifically, the circulation is carried out in a cycle 7 of "1, 8, 0, . . . , 2, 9, 1, 8, 0, . . . , 2, 9, . . . ". This indicates that all of the carrier frequencies appearing in the hopping sequence can be received at the same frequency in the intermittent receiving timing.

Figure 5:
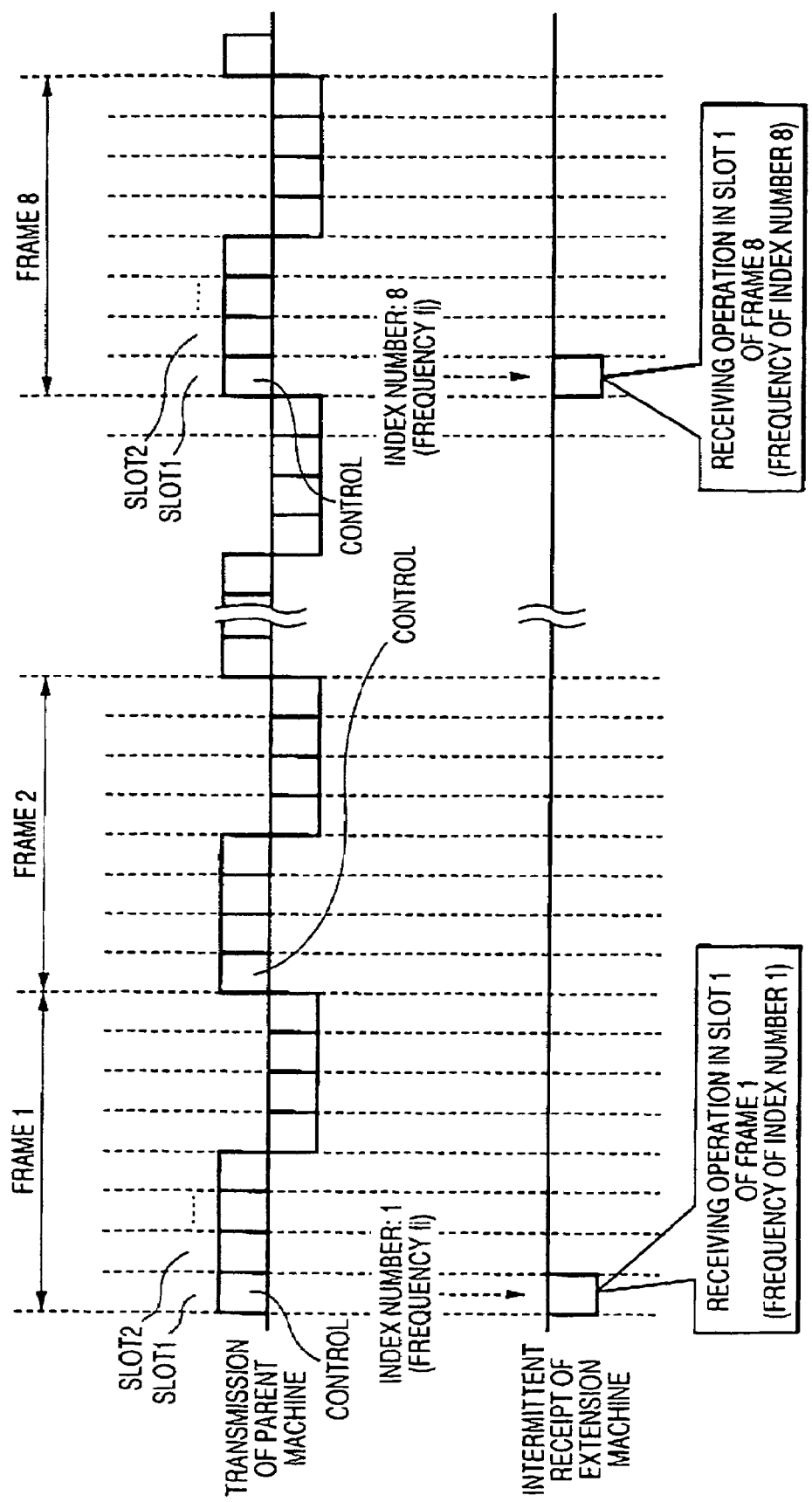
FIG. 5 is an explanatory diagram showing the intermittent receiving cycle in the case in which the intermittent receiving cycle is set to be 7 and the number of the hopping carrier frequencies to be used is set to be 15.

FIG. 5 is an explanatory diagram showing a receiving cycle in the case in which the intermittent receipt is carried out in accordance with the example illustrated in FIG. 4(a). A parent machine transmits control information through the slot 1 of each frame. An extension machine carries out an intermittent receiving operation for receiving the control information intermittently (in a 7-frame cycle). If a carrier has a frequency with an Index number: 1 when the slot 1 of the frame 1 is received at a certain time (an intermittent receiving number: 0), the carrier has a frequency with an Index number: 8 when the slot 1 of a frame 8 is subsequently received (the intermittent receiving number: 1). In a further receipt (the intermittent receiving number : 2), the carrier has a frequency with an Index number: 0 (not shown).

Moreover, FIG. 4(b) is a table showing a relationship in the case in which the intermittent receiving cycle is set to be 16 and the number of the hopping carrier frequencies to be used is set to be 15 as an example. FIG. 4(c) is a table showing a relationship in the case in which the intermittent receiving cycle is set to be 64 and the number of the hopping carrier frequencies to be used is set to be 15 as an example. FIG. 4(d) is a table showing a relationship in the case in which the intermittent receiving cycle is set to be 15 and the number of the hopping carrier frequencies to be used is set to be 16 as an example.

Figure 6:
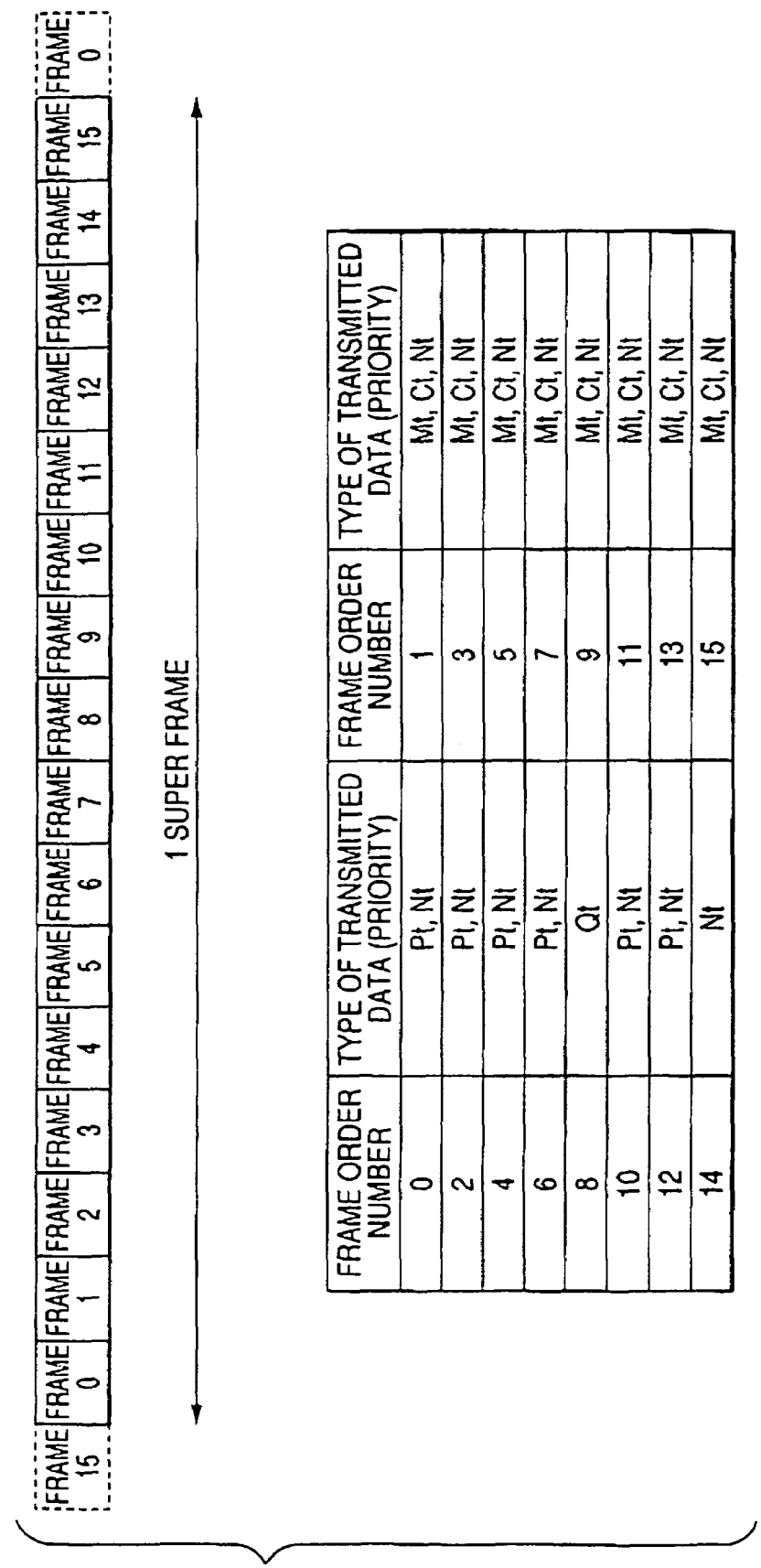
FIG. 6 is an explanatory diagram showing a super frame in a DECT method and an explanatory diagram showing the relationship of the type of data transmitted from a radio base station for each frame index in the super frame.

FIG. 6 is an explanatory diagram showing a super frame in the ETSI standard EN 300 175-3, for example, in a well-known DECT (Digital Enhanced Cordless Telephone) method and a table showing the relationship of the type of data to be transmitted from a radio base station every each frame index in the super frame. By using these drawings, an operation will be described below.

As shown in FIG. 6, 16 frames are defined to be the super frames in the DECT method, and the type of data to be transmitted every frame order number in the super frame is determined. In the drawing, a Pt message for giving a notice of an arrival is transmitted with frame order numbers 0, 2, 4, 6, 10 and 12 in the super frame. Only in the case in which the transmission of the Pt message is usually started with the frame order number of 0 and the Pt message is subsequently present, the transmission is carried out by using the frame order numbers of 2, 4, 6, 10 and 12. More specifically, if the intermittent receipt is executed in the timing of the frame order number of 0 in the super frame, the radio terminal can wait for the arrival while maintaining a super frame synchronization.

In the DECT method, moreover, the intermittent receipt in maximum 4 super frame cycles, that is, maximum 64 frame cycles is taken into consideration in order to support the radio terminal for carrying out the intermittent receipt more positively.

From the foregoing, an example of the intermittent receipt corresponding to the super frame synchronization also in the radio communication apparatus using the frequency hopping method according to the example is shown in FIGS. 4(b) and 4(c). FIG. 4(b) is a table showing a relationship in the case in which the number of the frames in the intermittent receiving cycle is set to be 16 to be the number of frames constituting one super frame and the number of the hopping carrier frequencies to be used is set to be 15, in which a frame number is increased by 16 to be the number of intermittent receiving cycle frames every time an intermittent cycle order number is increased by one, while a reference index number is circulated without the same number appearing by setting, as a cycle, 15 to be the number of hopping carrier frequencies to be used. More specifically, there is shown that all of the carrier frequencies appearing in a hopping sequence can be received at the same frequency in the intermittent receiving timing.

This is carried out in order to satisfy a condition that the number of cycle frames for executing the intermittent receipt and the number of the hopping carrier frequencies have a prime relationship with each other if the number of the hopping carrier frequencies does not include 2 as a factor, that is, the same number is set to be odd because 16 to be the number of the frames constituting the super frame is expressed in a power of 2 (2 to the fourth power).

FIG. 4(c) is a table showing a relationship in the case in which the number of the frames in the intermittent receiving cycle is set to be 64 to be the number of frames in 4 super frame cycles and the number of the hopping carrier frequencies to be used is set to be 15, in which a frame number is increased by 64 to be the number of intermittent receiving cycle frames every time an intermittent cycle order number is increased by one, while a reference index number is circulated without the same number appearing by setting, as a cycle, 15 to be the number of hopping carrier frequencies to be used. This is carried out in order to satisfy a condition that the number of cycle frames for executing the intermittent receipt and the number of the hopping carrier frequencies have a prime relationship with each other because 16 to be the number of the frames constituting the super frame is expressed in a power of 2, and furthermore, the intermittent receiving cycle is set to be the power of 2 of the super frame cycle to set a factor to only 2 and the number of the hopping carrier frequencies is set to be an odd number which does not include 2 as a factor.

Next, FIG. 4(d) shows an example of the case in which the number of the frames constituting the super frame is odd as an example of the case in which the number of the frames constituting the super frame cannot be expressed in the power of 2 described above. FIG. 4(d) is a table showing a relationship in the case in which the number of the frames in the intermittent receiving cycle is set to be 15 to be the number of frames in one super frame cycle and the number of the hopping carrier frequencies to be used is set to be 16, in which a frame number is increased by 15 to be the number of intermittent receiving cycle frames every time an intermittent cycle order number is increased by one, while a reference index number is circulated without the same number appearing by setting, as a cycle, 16 to be the number of hopping carrier frequencies to be used. More specifically, it is indicated that all of the carrier frequencies appearing in the hopping sequence can be received at the same frequency in the intermittent receiving timing.

This is carried out in order to satisfy a condition that the number of the cycle frames for executing the intermittent receipt and the number of the hopping carrier frequencies have a prime relationship with each other if a number having no common factor, that is, expressed in a power of 2 is set to be the number of the hopping carrier frequencies because 15 to be the number of the frames constituting the super frame is odd.

In the example, a threshold for deciding the replacement of a carrier frequency having an interference is changed to quicken a replacement timing after the start of a communication corresponding to the state of the interference of the hopping carrier frequency decided previously before the start of the communication. Consequently, it is possible to shorten a time required from the start of the communication to a change to an optimum hopping pattern to relieve a mutual interference with other apparatuss, thereby enhancing an interference avoiding capability. Moreover, all of the carrier frequencies described in the hopping pattern are selected by repeating the intermittent receipt at a time corresponding to the total number of the hopping carrier frequencies. Consequently, control channel information transferred by the radio base station can be obtained, and at the same time, the interference situations of all of the carrier frequencies can be monitored before the start of the communication. Furthermore, there are provided the interference observing means for observing the interference state of a hopping carrier frequency which is monitored, the interference carrier pre-discriminating means for previously discriminating a hopping carrier frequency having an interference before the start of the communication, the hopping carrier replacing means for replacing a hopping carrier frequency with a spare carrier frequency when deciding that the interference frequency of the hopping carrier frequency exceeds a predetermined threshold after the start of the communication, and the replaced carrier notifying means for notifying a communication partner of the contents of the hopping carrier frequency replaced by the interference and causing mutual hopping patterns to be coincident with each other. Consequently, it is possible to enhance an interference avoiding capability in the communication by changing a threshold for deciding the replacement of the carrier frequency having an interference after the start of the communication to quicken a replacement timing corresponding to the interference state of the hopping carrier frequency which is previously discriminated before the start of the communication.

SECOND EXAMPLE

A second example of the invention will be described below with reference to FIGS. 7 to 13.

Figure 7:
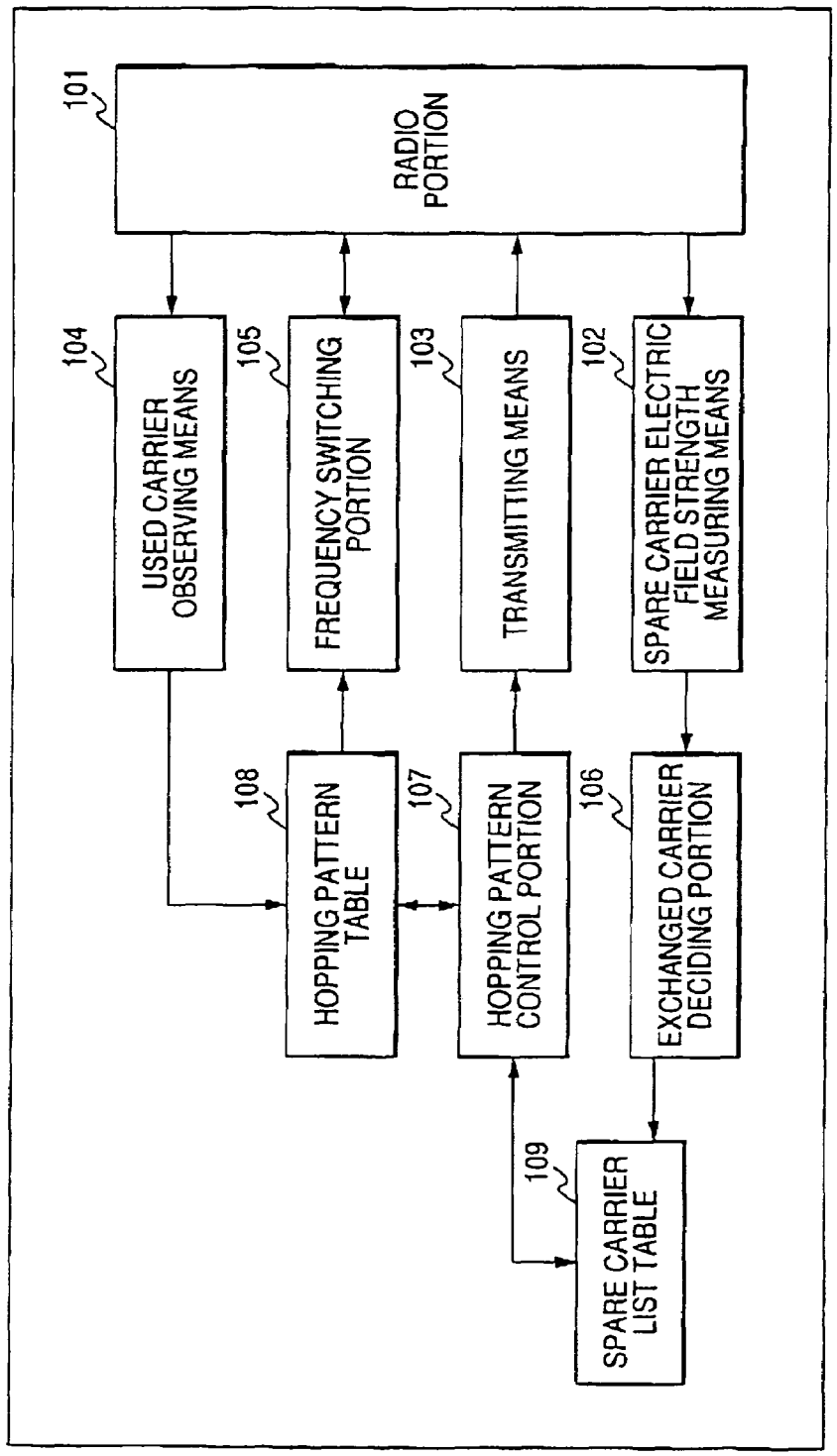
FIG. 7 is a diagram showing the structure of an FHSS communication apparatus according to a second example of the invention.

FIG. 7 is a diagram showing the structure of an FHSS communication apparatus according to an example. As shown in FIG. 7, the FHSS communication apparatus is constituted by a hopping pattern table 108 for managing a carrier frequency to be used for hopping and a receiving state thereof, a frequency switching portion 105 for sequentially switching a carrier frequency to be communicated in accordance with a hopping pattern, used carrier observing means 104 for observing the receiving state of a carrier frequency which is being used as a hopping pattern, spare carrier electric field strength measuring means 102 for measuring the electric field strength of a spare carrier by utilizing a free time for a transmission and receipt, an exchanged carrier deciding portion 106 for deciding whether the carrier is an exchangeable spare carrier depending on a comparison of the result of the measurement with a set threshold, a spare carrier list table 109 for managing the exchange priority of all spare carriers, a hopping pattern control portion 107 for controlling the exchange of a carrier frequency based on the hopping pattern table and the spare carrier list table, transmitting means 103 for transmitting carrier frequency exchanging information to a communication partner, and a radio portion 101 for establishing a radio link and transmitting/receiving data to/from a communication partner.

Figure 8:
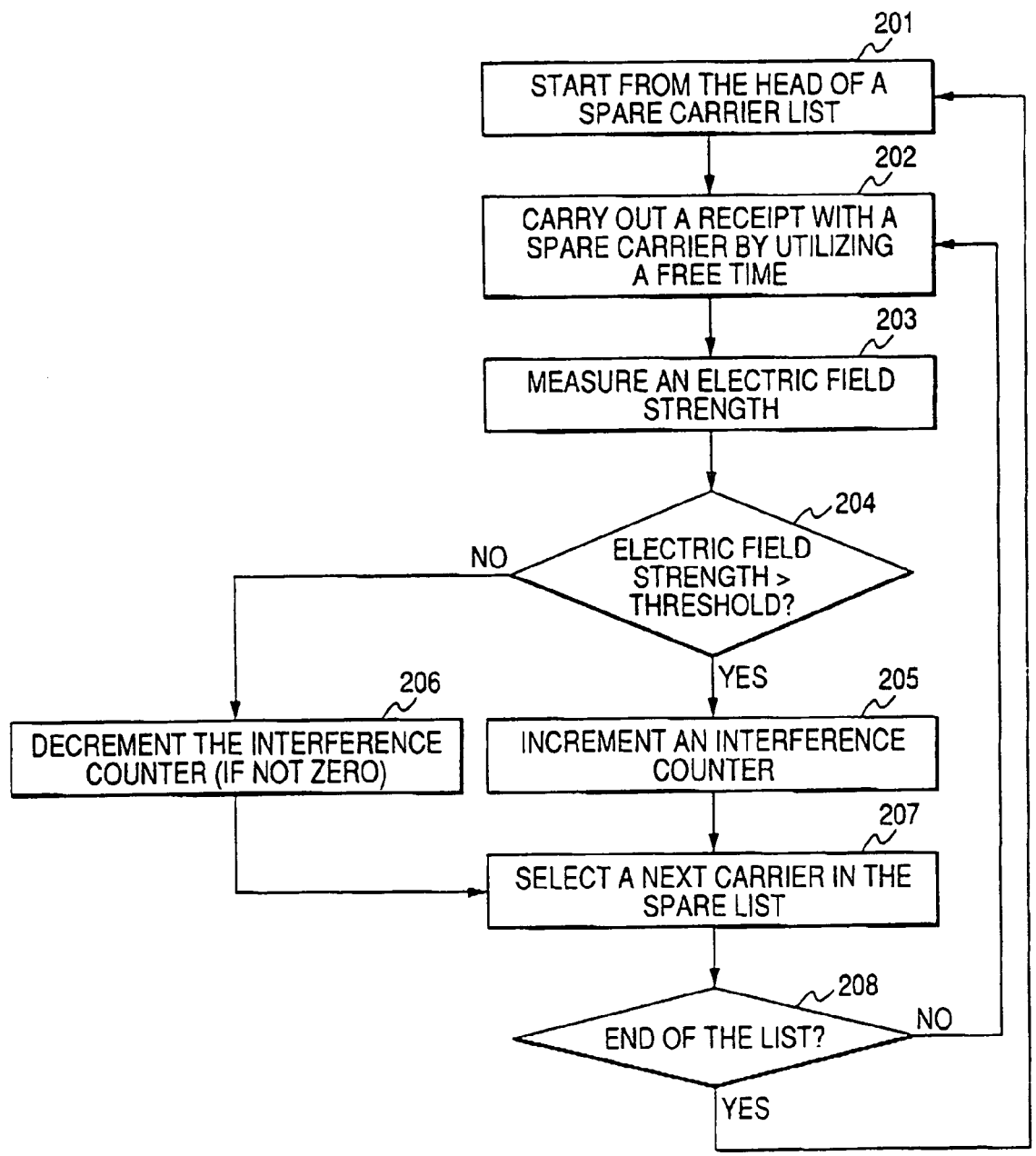
FIG. 8 is a flow chart showing a receipt processing in a spare carrier according to the second example.

Description will be given to the operation of the FHSS communication apparatus having the structure described above. FIG. 8 shows a processing of deciding that a spare carrier is an exchangeable/unexchangeable carrier frequency. FIG. 9 shows a spare carrier list table in the start of a communication, in which each spare carrier has an interference counter initialized to "1". In the FHSS communication apparatus for carrying out the communication by using a time division multiplex processing, there is present a time that neither a transmission nor a receipt is carried out. By using the free time, a receiving operation is carried out in order from the head of the spare carrier list (FIG. 8: steps 201 and 202). The communication partner never carries out a transmission processing with the spare carrier in the free time. Therefore, a radio wave received in the receipt processing is a disturbance wave generated by other radio apparatuses.

The spare carrier electric field strength measuring means 102 measures an electric field strength in the receipt (FIG. 8: step 203), and compares the electric field strength with the threshold of a preset electric field strength (FIG. 8: step 204). If the electric field strength is greater, it is decided that a communication is hard to perform with the interference of the disturbance wave even if a spare carrier thereof is used and the interference counter of the spare carrier is incremented (FIG. 8: 205). To the contrary, if the electric field strength is smaller, it is decided that the interference of the disturbance wave is not received even if the spare carrier is used and the interference counter of the spare carrier is decremented (if it is not "0") (FIG. 8: step 206). In the exchange of a carrier frequency, a carrier frequency having an interference counter value of "0" is set to be an exchangeable carrier frequency and others are set to be unexchangeable carrier frequencies.

Figure 12:
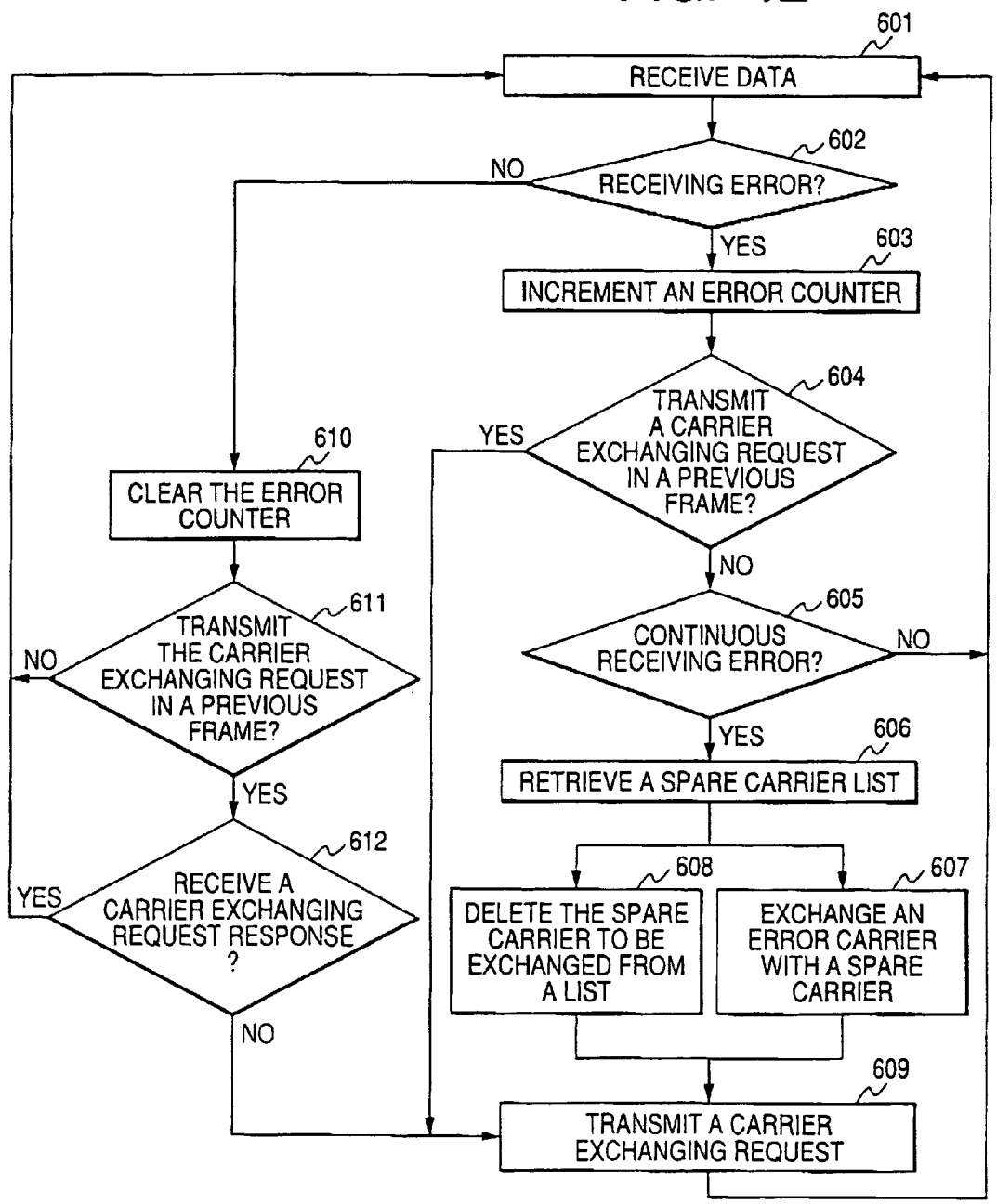
FIG. 12 is a flow chart showing a processing in the exchange of the carrier frequency according to the second example.

FIG. 12 shows a processing to be carried out in the exchange of the carrier frequency. FIG. 10 shows a hopping pattern table in the start of a speech, in which respective used carriers have error counters initialized to "0". FIG. 11 shows a change caused before and after the exchange of the carrier frequency in the spare carrier list table and the hopping pattern table.

When the communication carrier frequency is sequentially switched to carry out the communication in accordance with the hopping pattern table shared by the communication partner, an error counter having a used carrier frequency $f_n$ is incremented (FIG. 12: step 603) if the used carrier observing means 104 detects a receiving error (FIG. 12: step 602), and the error counter is initialized to "0" (FIG. 12: step 610) if a normal receipt is carried out. In that case, if an error counter value is equal to or greater than "2", that is, a continuous receiving error is made (FIG. 12: step 605), it is decided that the used carrier $f_n$ is subjected to the interference of a disturbance wave and the processing proceeds to a carrier frequency exchanging operation. A retrieval is carried out in order from the head of the spare carrier list table and is ended when an exchangeable carrier frequency $f_r$ is found, and the frequency $f_r$ is deleted as a carrier frequency to be an exchange candidate from the spare carrier list (FIG. 12: step 608). In that case, the hopping pattern control portion 107 carries out a replacement in a position $f_r$ in which $f_n$ of the hopping pattern table is placed (FIG. 12: step 607) and the error counter is initialized to "0". $f_n$ is added to the end of the spare carrier list table to initialize the interference counter to "3".

The transmitting means 103 utilizes a control field in a transmission with a next hopping frequency $f_{n+1}$ to transmit a carrier frequency exchange request to a communication partner (FIG. 12: step 609) and confirms a response from the communication partner in a receipt at $f_{n+1}$. If the response cannot be confirmed due to a receiving error (FIG. 12: step 604) or the communication partner does not return the response due to the receiving error (FIG. 12: step 612), the same processing is carried out in the transmission and receipt at a next hopping frequency $f_{n+2}$.

THIRD EXAMPLE

A third example of the invention will be described below with reference to FIG. 13.

Figure 13:
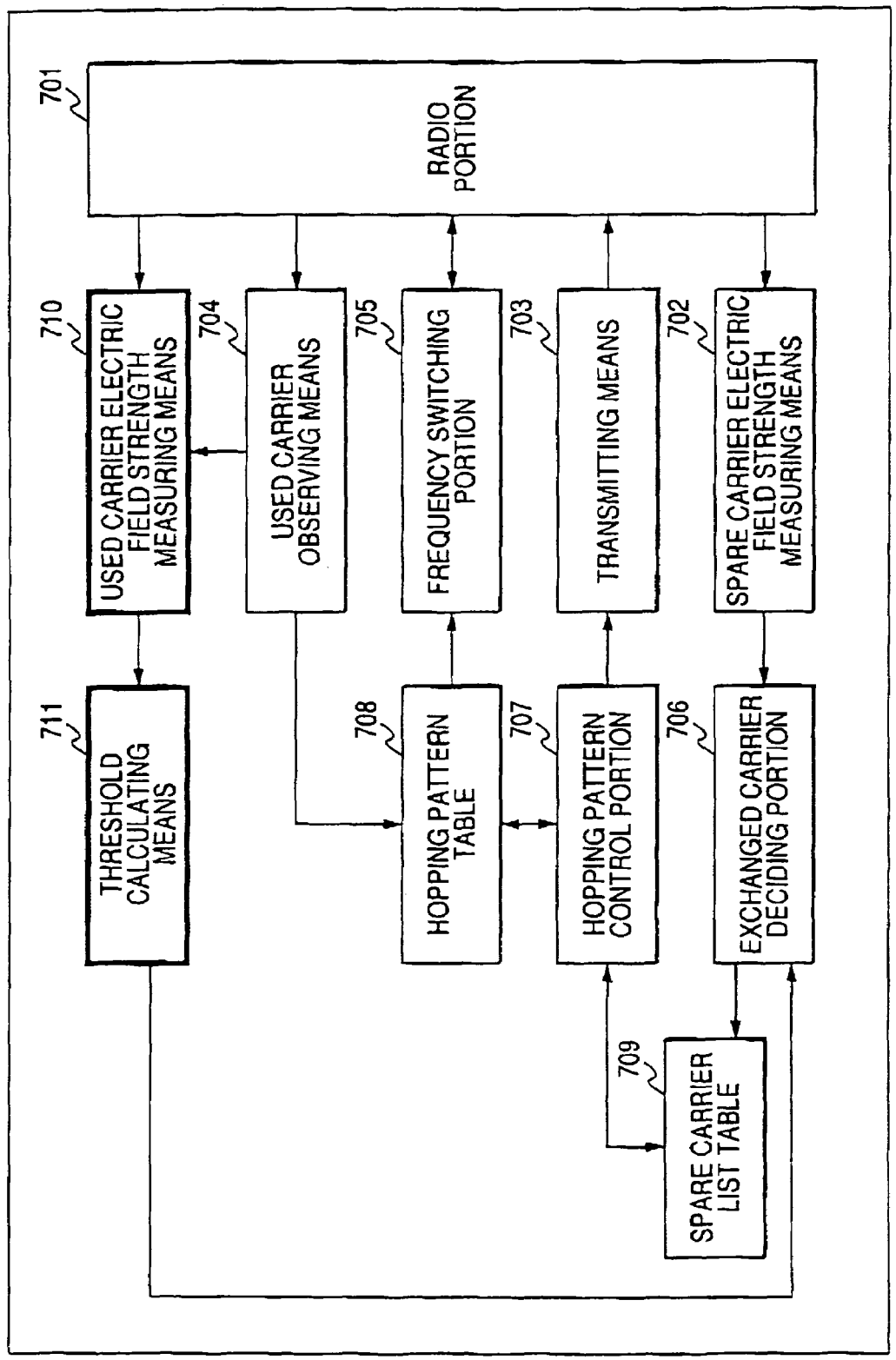
FIG. 13 is a diagram showing the structure of an FHSS communication apparatus according to an example of claim 2 of the invention.
Figure 14:
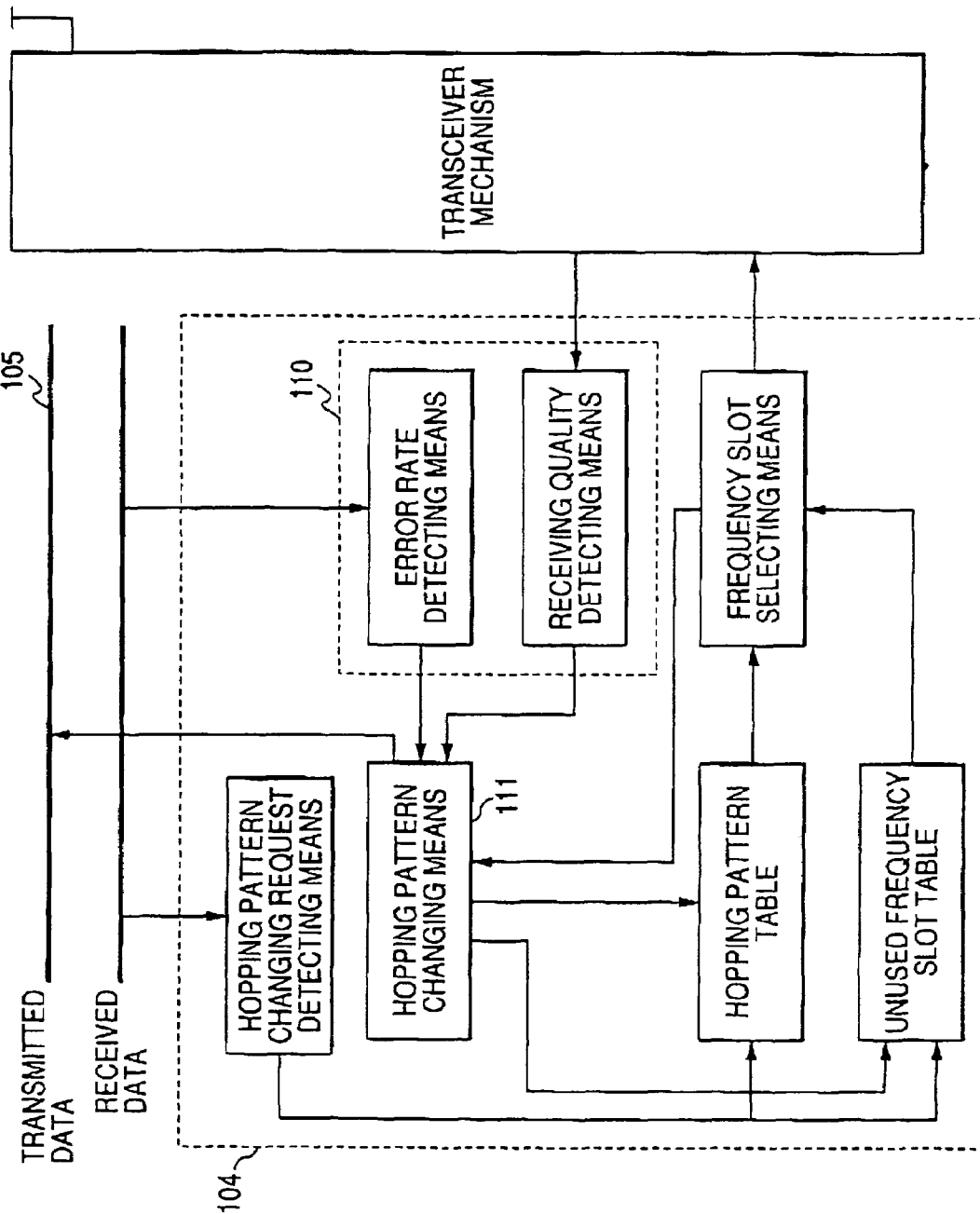
FIG. 14 is a diagram showing the structure of a conventional frequency hopping communication apparatus.

FIG. 13 is a diagram showing the structure of an FHSS communication apparatus according to the third example. As shown in FIG. 13, used carrier electric field strength measuring means 710 for measuring the electric field strength of a used carrier and threshold calculating means 711 are provided in the structure according to the first example.

Description will be given to the operation of the FHSS communication apparatus having the structure described above. When a communication carrier frequency is to be sequentially switched to carry out a communication in accordance with a hopping pattern table shared by a communication partner, used carrier observing means 704 observes a receiving error/normal receipt. Only in the case in which a normal receipt is carried out, the used carrier electric field strength measuring means 710 measures an electric field strength. When a communication can be carried out in a certain environment depends on the electric field strength value of a relative disturbance wave in place of the electric field strength value of an absolute disturbance wave (In the case in which the electric field strength of the communication carrier frequency is great because a communication distance is small, the communication can be carried out even if the electric field strength of the disturbance wave is slightly great. To the contrary, in the case in which the electric field strength of the communication carrier frequency is small because the communication distance is great, the communication is hard to perform even if the electric field strength of the disturbance wave is small to the same degree). Consequently, the threshold value calculating means 711 presets "a difference" between the electric field strength of the communication carrier frequency and the electric field strength of the disturbance wave so as to be communicatable and a threshold is calculated from the electric field strength of the communication carrier frequency which is measured and the "difference". The threshold is used as the threshold of the electric field strength to be used for deciding whether or not the spare carrier can be exchanged in the first example.

If a method of storing N electric field strengths of each frequency of a communication carrier and calculating a threshold from an average value for past N times is selected as a method of calculating a threshold in the threshold calculating means 711, it is possible to calculate a threshold which does not influenced by an electric field strength which is greatly changed by chance due to the temporary crossing operation of a physical shielding thing against a radio wave.

By selecting, for another calculating method, a method of calculating $(A \times W)/(W+1)+R/(W+1)$ as an average value with a measured electric field strength represented by R, an average value represented by A and a weight represented by W, thereby carrying out weighing in order to greatly reflect the value of the electric field strength which is measured more recently, moreover, it is possible to suppress the influence of a great change in the electric field strength which is generated by chance and to set a threshold capable of following a change in the electric field strength due to an actual physical movement.

As is apparent from the above description, according to the example of the invention, even if a certain carrier frequency used as a hopping pattern is subjected to the interference of a disturbance wave and is exchanged with a spare carrier, it then observes a receiving state continuously as a spare carrier having the lowest priority. Consequently, it is possible to recycle the carrier frequency as an exchangeable carrier frequency after sufficiently confirming that the carrier frequency can be communicated. Thus, it is possible to obtain such an advantage as to continuously hold quality of a communication which is always stable corresponding to various changes in a radio environment in the communication for a long period of time.

In the example of the invention, furthermore, the electric field strength of a used carrier is measured during a communication and a threshold for increasing or decreasing the interference counter of each spare carrier is dynamically changed corresponding to a change in the electric field strength of the used carrier. Consequently, the number of exchangeable spare carriers can be increased or the exchange of a useless carrier frequency can be avoided. Thus, it is possible to obtain an advantage that an efficient exchange can be carried out.

In a method of switching a hopping carrier frequency in order of hopping described in a hopping carrier table, a radio communication apparatus according to the invention has such a structure as to receive the control channel of a communication partner every constant cycle in a state set before the start of a radio communication, to carry out an intermittent receipt, to set the total number of hopping carrier frequencies in the hopping carrier table to be m, to skip the hopping order in the hopping carrier table by n every intermittent receiving cycle in an intermittent receiving operation to carry out switching, and to cause the n and the total number m of the hopping carrier frequencies to have a prime relationship with each other, that is, to cause both of them to have the greatest common divisor of 1 without a common factor.

Thus, the number n of skips of the carrier frequency in the intermittent receiving operation and the total number m of the hopping carrier frequencies have no mutual common factor. For this reason, the least common multiple is obtained by their product, and the same frequency is not received for a period in which hopping is carried out corresponding to a number represented by the product of n and m. Consequently, the frequency of the intermittent receiving operation is circulated by setting the total number of hopping carrier frequencies to be a cycle. By simply carrying out the intermittent receipt of a control channel with the skip number n, accordingly, it is possible to receive all of the carrier frequencies described in the hopping carrier table.

In the case in which one frame is constituted by a plurality of transmitting slots and a plurality of receiving slots and the carrier frequency is switched every slot in order of the hopping carrier table, moreover, a first communication apparatus transmits control information in a predetermined transmitting slot in one frame and a second communication apparatus to be a partner thereof carries out an intermittent receiving operation for intermittently rising and receiving the control information transmitted from the first communication apparatus in a predetermined slot every constant frame cycle. In the intermittent receiving operation, the number of frames to be an intermittent receiving cycle (the number of frames for which the receipt is to be carried out) and the total number of the hopping carrier frequencies described in the hopping carrier table are set to have a prime relationship with each other.

According to this structure, the number of cycle frames for executing the intermittent receipt and the total number of the hopping carrier frequencies have no common factor to each other. For this reason, the least common multiple is obtained as each product, and a remainder obtained by dividing a frame number in an intermittent receiving cycle timing by the total number of the hopping carrier frequencies is not equal in a frame section represented by the least common multiple and is circulated by setting the total number of the hopping carrier frequencies as a cycle. More specifically, the hopping carrier frequency designating means receives an intermittent receiving cycle timing which is equal to the total number of the hopping carrier frequencies into the frame section represented by the least common multiple, and the circulated remainder is set to be an index to refer to the hopping carrier table, thereby selecting the hopping carrier frequency. Accordingly, the radio communication apparatus using a frequency hopping method according to the invention can receive all of the carrier frequencies described in the hopping carrier table by simply carrying out the intermittent receipt of the control channel of an opposed radio base station in a previous stage to the start of a communication.

In an intermittent receiving method for carrying out the intermittent receipt of the intermittent receiving means on a super frame unit, moreover, the super frame cycle is set to be a number which can be expressed in a power of 2 and the number of the hopping carrier frequencies described in the hopping carrier table is set to be odd. Moreover, the number of the cycle frames of the intermittent receipt is set to be a power of 2 of the super frame cycle and the number of the hopping carrier frequencies is set to be odd.

By these structures, a super frame synchronization can be maintained. By receiving specific information such as an arrival notice given in the super frame cycle, therefore, it is possible to relieve the consumed current of an apparatus in a standby in which a communication is not carried out and to receive all of the carrier frequencies which are hopped before the communication.

Even if the intermittent receiving cycle of the intermittent receiving means is set to be odd and the number of the hopping carrier frequencies can be expressed in a power of 2, furthermore, all of the carrier frequencies hopped before the communication can also be received.

In addition, the radio communication apparatus according to the invention comprises interference observing means for monitoring data received by a communication apparatus to be a partner to observe the interference situation of a hopping carrier frequency, and interference carrier pre-discriminating means for previously discriminating a carrier frequency having an interference from the hopping carrier frequencies received before the start of a communication.

According to this structure, it is possible to monitor the interference situations of all hopping carrier frequencies described in a hopping carrier table every constant cycle simultaneously with the receipt of the control channel and to previously discriminate a carrier frequency having an interference from the received hoping carrier frequencies by simply monitoring the interference situations of the control channels of opposed radio base stations in an intermittent receiving timing before the start of the communication. Thus, it is possible to carry out a detection following a change in the frequency of a fixed disturbance wave by other apparatuses using the same frequency band if any.

Moreover, there are provided a spare carrier table for describing a spare carrier frequency other than the carrier frequency described in the hopping carrier table, hopping carrier replacing means for replacing the hopping carrier frequency described in the hopping carrier table with the carrier frequency described in the spare carrier table when deciding that the interference frequency of the hopping carrier frequency exceeds a predetermined threshold based on the result of the observation of the interference observing means, and replaced carrier notifying means for notifying a communication partner of the contents of the hopping carrier frequency replaced by an interference to cause mutual hopping patterns to be coincident with each other.

According to this structure, when it is detected that an interference is received by the disturbance of other apparatuses using the same frequency band after a hopping carrier frequency group to be used starts a communication, the carrier frequency having the interference is replaced with a carrier frequency selected from an unused spare carrier frequency group, and furthermore, a communication partner is also notified of the carrier frequency having the interference the carrier frequency to be replaced to carry out a modification to have the same hopping pattern. Therefore, it is possible to avoid a disturbance while following a change in the interference situation of the hopping carrier frequency to be used for the communication.

Based on the result of the discrimination of the interference carrier pre-discriminating means, moreover, a threshold condition to be replaced with a spare carrier frequency is changed by the hopping carrier replacing means. Consequently, it is possible to quicken the replacement of the hopping carrier frequency having the interference after the start of the communication, thereby enhancing an interference avoiding capability.

Moreover, the frequency hopping communication apparatus is characterized in that the electric field strength of the carrier frequency in a spare carrier list is measured to observe a spare carrier and to increase or decrease an interference counter having the spare carrier corresponding to a frequency at which the electric field strength exceeds a predetermined threshold. An exchange with a used carrier subjected to a disturbance is carried out in order from a spare carrier having the lowest frequency at which a threshold is exceeded depending on the order of the value of the interference counter in the case in which the used carrier subjected to the disturbance in a hopping pattern is to be exchanged with one of the spare carriers, and the carrier frequency deleted from the hopping pattern is set to have the worst value as the initialized value of the interference counter (a frequency at which the electric field strength exceeds the threshold is maintained to be high so that an interference counter to be reached has a maximum or minimum value).

By this structure, the observation of the carrier frequency deleted from the hopping pattern is started from the worst interference counter value. Therefore, a state of "exchange impossible" is maintained until the frequency at which the electric field strength measured for the frequency exceeds a threshold is sufficiently reduced. Consequently, the carrier frequency is recycled as an exchangeable carrier frequency after the interference counter for the carrier frequency has the best value, that is, it is sufficiently confirmed that the carrier frequency can carry out a communication. Therefore, it is possible to have a function of always holding stable quality of a communication continuously corresponding to various changes of a radio environment in the communication for a long period of time.

Furthermore, the frequency hopping communication apparatus according to the eighth aspect of the invention is characterized in that the interference of a disturbance wave is received and a carrier frequency exchanged with a spare carrier is added to the end of a spare carrier list so that a priority to be used again as a hopping carrier frequency is set to be lower than other spare carriers. The frequency hopping communication apparatus has the function of immediately recycling the carrier frequency deleted from the hopping pattern upon receipt of an interference and avoiding a deterioration in radio quality, thereby holding stable quality of a communication.

Moreover, the frequency hopping communication apparatus according to the first aspect of the invention is characterized in that the electric field strength of a used carrier is measured during a communication and a threshold for increasing or decreasing an interference counter having each spare carrier is dynamically varied corresponding to a change in the electric field strength of the used carrier. When the measured electric field strength is great, it is possible to increase a threshold, thereby easily deciding that the spare carrier can be exchanged. When the measured electric field strength is small, it is possible to decrease the threshold, thereby easily deciding that the spare carrier cannot be exchanged. Consequently, the frequency hopping communication apparatus has a function capable of increasing the exchangeable spare carriers and avoiding the useless exchange of the carrier frequency, thereby exchanging the carrier frequency efficiently.

In addition, there is a function capable of calculating a threshold which does not influenced by an electric field strength changed greatly by chance due to the temporary crossing operation of a physical shielding thing against a radio wave, for example, in the case in which a threshold for increasing or decreasing the interference counter having each spare carrier is to be calculated from an average value for past N times of the electric field strength of the used carrier.

In the invention according to the twelfth aspect of the invention, the frequency hopping communication apparatus according to the fourth aspect of the invention is characterized in that the value of an electric field strength measured most recently is weighed to be reflected greatly as a method of calculating the average value of the electric field strength of the used carrier which is utilized for calculating a threshold for increasing or decreasing the interference counter of each spare carrier. The frequency hopping communication apparatus has a function capable of suppressing the influence of a great change in the electric field strength which is generated by change, and furthermore, setting a threshold which can also follow a change in the electric field strength by an actual physical movement.

CROSS REFERENCE TO RELATED APPLICATION

This application is based upon and claims the benefit of priority of Japanese Patent Application No 2003-195057 filed on Mar 7, 1910 and Japanese Patent Application No 2003-195059 filed on Mar. 7, 1910, the contents of which are incorporated herein by references in its entirety.

What is claimed is:

1. A radio communication apparatus using a frequency hopping method, comprising:

a hopping carrier instruction section that indicates to a radio control portion to change a hopping carrier frequency according to a pre-determined hopping pattern based on a hopping carrier table; and an intermittent signal receiving section that activates said hopping carrier instruction section at each fixed period in a state set before a start of a radio communication and that instructs to receive the control channel of an opposing radio communication station, wherein in a relationship between an intermittent signal receiving cycle and a hopping carrier number in use, the frequency frame cycle to carry out intermittent receipt and the total number of the hopping carrier frequencies described in the hopping carrier table are set to have a prime relationship with each other.

2. The radio communication apparatus using a frequency hopping method as described in claim 1, wherein in the intermittent signal receiving section conducting intermittent signal receipt by the intermittent signal receiving section in super frame unit, the super frame cycle is set to have a number which can be expressed in a power of 2, and the total number of the hopping carrier frequencies described in the hopping carrier table is set to be odd.

3. The radio communication apparatus using a frequency hopping method as described in claim 2, comprising a plurality of cycle frames for executing the intermittent receipt by the intermittent signal receiving section, wherein a number of the cycle frames is set to be a power of 2 of the super frame cycle, and wherein the number of the cycle frames and the number of the hopping carrier frequencies is set to be odd.

4. The radio communication apparatus using a frequency hopping method as described in claim 1, comprising a plurality of cycle frames for executing the intermittent receipt by the intermittent signal receiving section, wherein a number of the cycle frames is set to be odd, and the total number of the hopping carrier frequencies is set to a number which can be expressed in a power of 2.

5. The radio communication apparatus according to any of claims 1 to 4, comprising:
an interference observing section that monitors data received by the radio control portion and that observes an interference situation of a hopping carrier frequency; and
an interference carrier pre-discriminating section that previously discriminates a carrier frequency having an interference from the hopping carrier frequency received before a start of a communication.

6. The radio communication apparatus according to claim 5, further comprising:
a spare carrier table that describes a spare carrier frequency other than the carrier frequency described in the hopping carrier table,
a hopping carrier replacing section that replaces the hopping carrier frequency described in the hopping carrier table with the carrier frequency described in the spare carrier table when deciding that an interference frequency of the hopping carrier frequency exceeds a predetermined threshold based on the result of an observation of the interference observing section after a start of a communication, and
a replaced carrier notifying section that notifies a communication partner of contents of the hopping carrier frequency replaced through an interference to cause mutual hopping patterns to be coincident with each other.

7. The radio communication apparatus according to claim 5, further comprising a hopping carrier replacing section that sets the accumulation interference level that represents the interference frequency of the hopping carrier to a value close to the threshold for replacing the spare carrier frequency based on the judgment of the interference carrier pre-discriminating section in a state before a start of a communication.

8. A radio communication apparatus using a frequency hopping method, which conducts the following steps:
measuring the electric field strength of carrier frequencies in a spare carrier frequency list, thereby observing the spare carriers in said spare carrier frequency list;
performing one of (i) increasing an interference counter of a spare carrier in said spare carrier frequency list in an event that its electric field strength exceeds a predetermined threshold and (ii) decreasing the interference counter, if greater than zero, of a spare carrier in said spare carrier frequency list in an event that its electric field strength does not exceed said predetermined threshold, so as to determine whether each of said spare carriers in said spare carrier frequency list is exchangeable; and
carrying out an exchange with (i) a used carrier that is included in a hopping pattern table and that has an error counter value above a given threshold and (ii) one of said spare carriers listed in said spare carrier frequency list, said one of said spare carriers being selected for said exchange in accordance with an exchange priority of said carriers listed in said spare carrier frequency list, and setting a frequency of said used carrier in said spare carrier frequency list with a value higher than said error counter value of said used carrier prior to said exchange, as an initialized value of its interference counter.

9. The radio communication apparatus using a frequency hopping method as described in claim 8, wherein said used carrier exchanged with said one of said spare carriers is added at the end of said spare carrier frequency list, thereby setting a priority of said used carrier for use again as a hopping carrier frequency to be lower than that of each of other spare carriers.

* * * * *

UNITED STATES PATENT AND TRADEMARK OFFICE
CERTIFICATE OF CORRECTION

PATENT NO.        : 7,356,104 B2
APPLICATION NO.   : 10/886585
DATED             : April 8, 2008
INVENTOR(S)       : Shinji Fukuda et al.

Page 1 of 1

It is certified that error appears in the above-identified patent and that said Letters Patent is hereby corrected as shown below:

On the title page: Item (73) is not included and should read:

Item (73)   Assignee:   Matsushita Electric Industrial Co., Ltd.,   Osaka (JP)

Signed and Sealed this

Thirty-first Day of August, 2010

David J. Kappos
*Director of the United States Patent and Trademark Office*